United States Patent
Kinoshita et al.

(10) Patent No.: US 8,819,995 B2
(45) Date of Patent: *Sep. 2, 2014

(54) WINDOW REGULATOR AND JIG

(75) Inventors: Kimihiro Kinoshita, Kanagawa (JP); Koji Kawamatsu, Aichi (JP)

(73) Assignees: Shiroki Kogyo Co., Ltd., Kanagawa (JP); Toyota Jidosha Kabushiki, Aichi (JP)

( * ) Notice: Subject to any disclaimer, the term of this patent is extended or adjusted under 35 U.S.C. 154(b) by 413 days.

This patent is subject to a terminal disclaimer.

(21) Appl. No.: 12/519,140

(22) PCT Filed: Dec. 13, 2006

(86) PCT No.: PCT/JP2006/324820
§ 371 (c)(1), (2), (4) Date: Jun. 12, 2009

(87) PCT Pub. No.: WO2008/072316
PCT Pub. Date: Jun. 19, 2008

(65) Prior Publication Data
US 2010/0031575 A1  Feb. 11, 2010

(51) Int. Cl.
*E05F 15/16* (2006.01)

(52) U.S. Cl.
USPC .................. 49/349; 49/348; 49/352

(58) Field of Classification Search
CPC ..... E05F 11/382; E05F 11/385; E05F 11/423; E05F 15/1669; E05F 11/481; E05F 11/445
USPC ........................... 49/348, 349, 352
See application file for complete search history.

(56) References Cited

U.S. PATENT DOCUMENTS

| | | | |
|---|---|---|---|
| 4,235,046 A | 11/1980 | Hess et al. | |
| 4,313,282 A | 2/1982 | Hagemann et al. | |
| 4,403,450 A * | 9/1983 | Ishii | 49/352 |
| 4,608,778 A * | 9/1986 | Shiraishi et al. | 49/352 |
| 4,657,523 A | 4/1987 | Chevance et al. | |
| 4,995,568 A * | 2/1991 | Yamagishi et al. | 242/125.1 |

(Continued)

FOREIGN PATENT DOCUMENTS

| | | |
|---|---|---|
| CN | 1137003 A | 12/1996 |
| DE | 3805576 | 10/1988 |

(Continued)

*Primary Examiner* — Katherine Mitchell
*Assistant Examiner* — Marcus Menezes
(74) *Attorney, Agent, or Firm* — Finnegan, Henderson, Farabow, Garrett & Dunner, L.L.P.

(57) ABSTRACT

A window regulator and a jig to facilitate assembly. The window regulator includes a drum configured to be able to rotate in a normal direction/reverse direction, an annular wire 71 partly wound around a drum, guide members 81, 83, 91 and 93 configured to guide the wire 71 in such a manner that the wire 71 is arranged along a direction of upward and downward movement of a window glass 53, slack preventing means configured to urge the wire 71 in a stretching direction and eliminate the slack of the wire 71, and window glass mounting means 101 and 103 configured to mount the window glass 53 to a portion of the wire 71 extending along the direction of upward and downward movement of the window glass 53, and a bracket 131 being mounted rotatably on the inner panel and having the guide member 83, and being configured to guide the guide member 83 to a mounting position on the inner panel is provided.

4 Claims, 8 Drawing Sheets

(56) References Cited

U.S. PATENT DOCUMENTS

| | | | |
|---|---|---|---|
| 5,617,675 A | 4/1997 | Kobrehel | |
| 5,673,515 A * | 10/1997 | Weber et al. | 49/352 |
| 5,694,717 A | 12/1997 | Gier | |
| 5,749,174 A | 5/1998 | Mariel | |
| 5,778,600 A * | 7/1998 | Chu | 49/352 |
| 6,161,337 A * | 12/2000 | Morando | 49/352 |
| 6,202,351 B1 | 3/2001 | Medebach | |
| 6,272,948 B1 | 8/2001 | Klipper | |
| 6,453,615 B1 * | 9/2002 | Berta et al. | 49/349 |
| 7,591,104 B2 | 9/2009 | Takeda et al. | |
| 7,774,985 B2 | 8/2010 | Miyagawa et al. | |
| 8,209,907 B2 * | 7/2012 | Kinoshita et al. | 49/352 |
| 2002/0083647 A1 * | 7/2002 | Bostian et al. | 49/352 |
| 2004/0134130 A1 * | 7/2004 | Dobson et al. | 49/352 |
| 2004/0144032 A1 * | 7/2004 | Smith | 49/352 |
| 2005/0072050 A1 * | 4/2005 | Yamamoto | 49/352 |
| 2009/0090065 A1 * | 4/2009 | Kinoshita et al. | 49/352 |
| 2010/0043295 A1 | 2/2010 | Barr et al. | |

FOREIGN PATENT DOCUMENTS

| | | |
|---|---|---|
| EP | 0 164 114 | 12/1985 |
| EP | 1 243 733 | 9/2002 |
| JP | 09-144424 | 6/1997 |
| JP | 10-121843 | 5/1998 |
| JP | 10-299335 | 11/1998 |
| JP | 11-044151 | 2/1999 |
| JP | 2000-356068 | 12/2000 |
| JP | 2002-138751 | 5/2002 |
| JP | 2002-309841 | 10/2002 |
| JP | 2003-020856 | 1/2003 |
| JP | 2003-293651 | 10/2003 |
| JP | 2006-348627 | 12/2006 |

* cited by examiner

WINDOW REGULATOR AND JIG

TECHNICAL FIELD

The present invention relates to a window regulator including a drum mounted on an inner panel of a door on the side of a surface opposing an outer panel and configured to be able to rotate in a normal direction and a reverse direction, an annular wire partly wound around the drum, a guide member mounted on the inner panel of the door on the side of the surface opposing the outer panel and configured to guide the wire so that the wire is arranged along a direction of upward and downward movement of a window glass, slack preventing means configured to urge the wire in a stretching direction and eliminate the slack of the wire, and window glass mounting means configured to mount the window glass to the wire at a portion extending along the direction of upward and downward movement of the window glass, in which the wire is moved by rotating the drum in the normal direction or the reverse direction to move the window glass upward and downward, and a jig used for assembling the window regulator.

BACKGROUND ART

Figure 8:
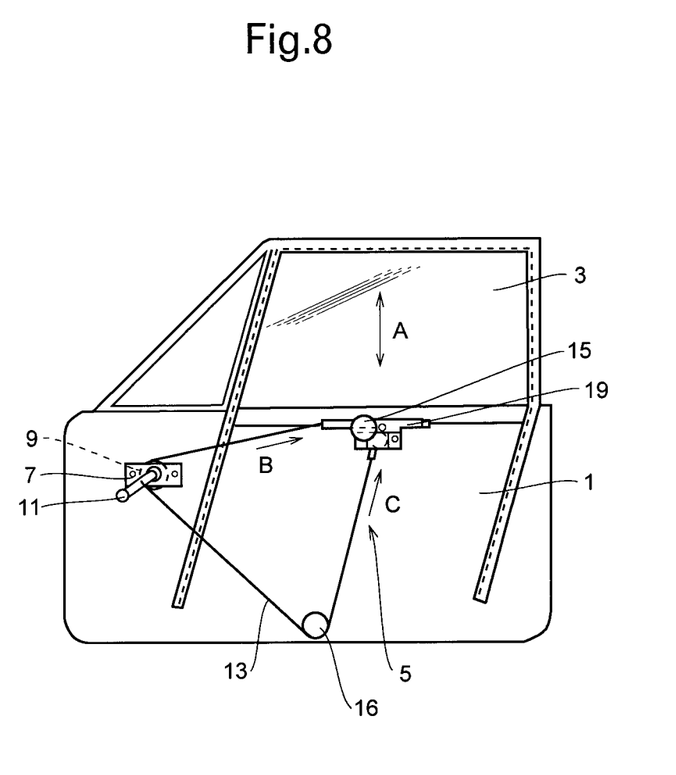
FIG. 8 is a drawing for explaining a wind regulator in the related art.

Referring to FIG. 8, an example of a window regulator using a wire will be described. In the drawing, a window regulator 5 for moving a window glass 3 upward and downward is disposed in a space between an inner panel (inside panel) and an outer panel (outside panel) which constitute a door panel 1.

Subsequently, a configuration of the window regulator 5 will be described. A drum 9 is provided on the inner panel on the side of the surface opposing the outer panel via a base 7. The drum 9 is configured to be rotated in a normal direction/a reverse direction by a handle 11. A wire 13 has a substantially annular shape and is partly wound around the drum 9.

The side of the surface of the inner panel of the door opposing the outer panel is provided with an upper guide member (pulley) 15 and a lower guide member (pulley) 16 configured to guide the wire 13. The wire 13 is arranged along the direction of upward and downward movement of the window glass 3 (the direction indicated by an arrow A in the drawing) by the upper guide member 15 and the lower guide member 16.

Window glass mounting means 19 for mounting the window glass 3 is provided on a portion of the wire 13 between the upper guide member 15 and the lower guide member 16 (a portion of the wire 13 extending along the direction of upward and downward movement of the window glass 3).

Then, the window glass mounting means 19 is provided with slack preventing means (not shown) configured to urge the wire 13 in a stretching direction (the directions indicated by an arrow B and an arrow C in the drawing) and eliminate the slack of the wire 13.

An operation of the configuration described above will be described.

The window glass 3 is moved upward and downward by moving the wire 13 by operating the handle 11 to rotate the drum 9 in the normal direction or the reverse direction (for example, see Patent Document 1).

Patent Document 1: JP-A-55-30095 (Specification from p. 2 to p. 3, FIG. 1, FIG. 2)

DISCLOSURE OF THE INVENTION

Problems to be Solved by the Invention

In the window regulator 5 shown in FIG. 8, the wire 13 is urged in the stretching direction (the direction indicated by the arrow B and the direction indicated by the arrow C) by the slack preventing means.

When assembling the window regulator 5, the base 7 provided with the drum 9 is mounted first, and then the upper guide member 15 and the lower guide member 16 are mounted. The guide member mounted at last of the upper guide member 15 and the lower guide member 16 is mounted on a predetermined position on the inner panel against an urging force of the slack preventing means. In addition, this operation is an operation to be performed in a narrow space between the outer panel and the inner panel.

Therefore, there is a problem of difficulty in assembly.

In view of such a problem, it is an object of the present invention to provide a window regulator which may be assembled easily and a jig.

Means for Solving the Problems

The invention for solving the above-described problem is a window regulator including a drum mounted on an inner panel of a door on the side of a surface opposing an outer panel and configured to be able to rotate in a normal direction and a reverse direction, an annular wire partly wound around the drum, a plurality of guide members mounted on the inner panel of the door on the surface opposing the outer panel and configured to guide the wire so that the wire is arranged along a direction of upward and downward movement of a window glass, slack preventing means configured to urge the wire in a stretching direction and eliminate the slack of the wire, and window glass mounting means configured to mount the window glass to the wire at a portion extending along the direction of upward and downward movement of the window glass, in which a bracket having an engaging portion which is engageable directly with the inner panel at one end portion thereof, a guide member from among the plurality of guide members provided at a midsection thereof, and being configured to guide the guide member to a mounting position on the inner panel against an urging force of the slack preventing means about the engaging portion as a center of rotation is provided.

The slack preventing means is configured to absorb the slack of the wire to prevent the wire from coming off the guide member.

When the wire is moved by rotating the drum in the normal direction or the reverse direction, the window glass mounted on the wire is moved upward and downward.

When the guide member is mounted on the inner panel, the bracket is mounted on the inner panel, the bracket is rotated against the urging force of the slack preventing means, and the guide member is guided to the mounting position on the inner panel.

The invention is also the above window regulator, characterized in that one of end portions of the bracket is mounted rotatably on the inner panel and the guide member is provided at a midsection thereof.

The invention is also the above window regulator, characterized in that a rotating plane of the bracket is a plane intersecting the inner panel.

The invention is also the above window regulator, characterized in that the rotating plane of the bracket is substantially parallel to the inner panel.

The invention also includes a jig used when assembling a window regulator including a drum mounted on an inner panel of a door on the side of a surface opposing an outer panel and configured to be able to rotate in a normal direction and a reverse direction, an annular wire partly wound around the drum, a guide member mounted on the inner panel of the door on the side of the surface opposing the outer panel and configured to guide the wire so that the wire is arranged along a direction of upward and downward movement of a window glass, slack preventing means configured to urge the wire in a stretching direction and eliminate the slack of the wire, and window glass mounting means configured to mount the window glass to the wire at a portion extending along the direction of upward and downward movement of the window glass, in which the wire is moved by rotating the drum in the normal direction or the reverse direction to move the window glass upward and downward, characterized in that an inner panel mounting portion being engageable and disengageable with respect to the inner panel and being rotatable with respect to the inner panel in a state of engaging the inner panel, and a guide member mounting portion which allows engagement and disengagement with the guide member.

The slack preventing means is configured to absorb the slack of the wire to prevent the wire from coming off the guide member.

When the wire is moved by rotating the drum in the normal direction or the reverse direction, the window glass mounted on the wire is moved upward and downward.

When mounting the guide member on the inner panel, the guide member is engaged with the jig, and the jig is engaged with the inner panel. The jig is rotated against the urging force of the slack preventing means to guide the guiding member to the mounting position on the inner panel to mount the guide member on the inner panel. Then, the jig is disengaged from the guide member and the inner panel.

Here, in the inventions, a resilient member includes a metal or resin spring, foamed resin, but is not limited thereto. The guide member for guiding the wire includes a pulley and a fixed guide formed with a groove which allows engagement with the wire on an outer peripheral surface thereof, but is not limited thereto.

Advantage of the Invention

According to the invention, the bracket is rotatably mounted on the inner panel. Therefore, the guide member may be guided to a mounting position on the inner panel only by rotating the bracket, so that easy assembly is achieved.

One of the end portions of the bracket is mounted rotatably on the inner panel and the guide member is provided at the midsection thereof. Therefore, the bracket may be rotated with a weak force by the principle of a lever only by applying an operating force to the side of the other end portion of the bracket. In other words, the guide member may be guided to the mounting position on the inner panel with the weak force, so that easy assembly is achieved.

The side of the surface of the inner panel opposing the outer panel is needed to have a portion where components or the like cannot be disposed (a dead space) so as to avoid interference with the rotating bracket. However, according to the invention, the rotating plane of the bracket is the plane intersecting the inner panel. Therefore, only a small dead space is necessary on the side of the surface of the inner panel opposing the outer panel.

According to the invention, the rotating plane of the bracket is substantially parallel to the inner panel. Therefore, it is also applicable to a door whose distance between the inner panel and the outer panel is small (a door having a small thickness).

According to the invention, the jig may be mounted rotatably on the inner panel. Therefore, the guide member may be guided to the mounting position on the inner panel only by rotating the jig, so that easy assembly is achieved.

BEST MODES FOR CARRYING OUT THE INVENTION

First Embodiment

Referring to the drawings, a first embodiment of the present invention will be described.

Figure 1:
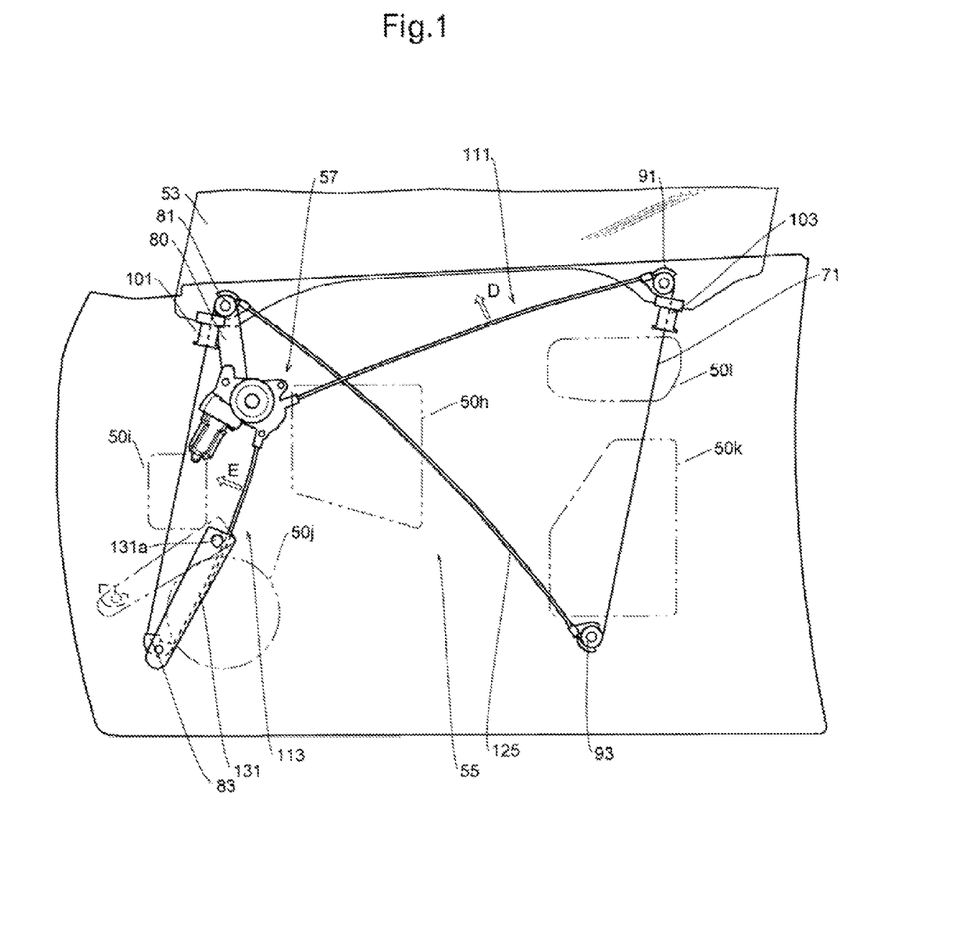
FIG. 1 is a drawing of a door provided with a window regulator according to a first embodiment in a state in which an inner panel is removed viewed from a cabin side.
Figure 4:
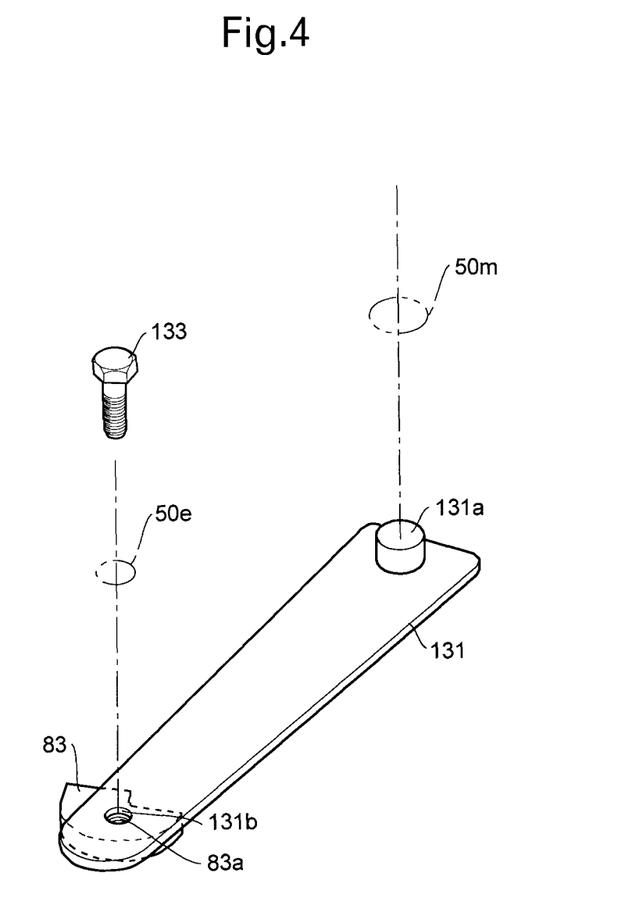
FIG. 4 is a perspective view of a bracket in FIG. 1.
Figure 5:
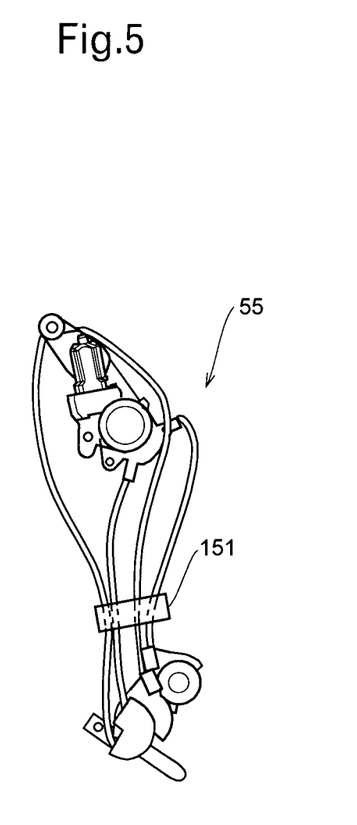
FIG. 5 is a perspective view of the window regulator provided for assembly.

First of all, referring to FIG. 1 to FIG. 5, a window regulator according to this embodiment will be described. FIG. 1 is a drawing of a door provided with the window regulator according to this embodiment in a state in which an inner panel is removed viewed from a cabin side, FIG. 2 is a drawing showing the inner panel to be mounted on the door in FIG. 1, FIG. 3(a) is an enlarged view, partly broken, of a wire drive unit in FIG. 1, FIG. 3(b) is an explanatory drawing of second slack preventing means, FIG. 4 is a perspective view of a bracket in FIG. 1, and FIG. 5 is a perspective view of the window regulator provided for assembly.

Figure 2:
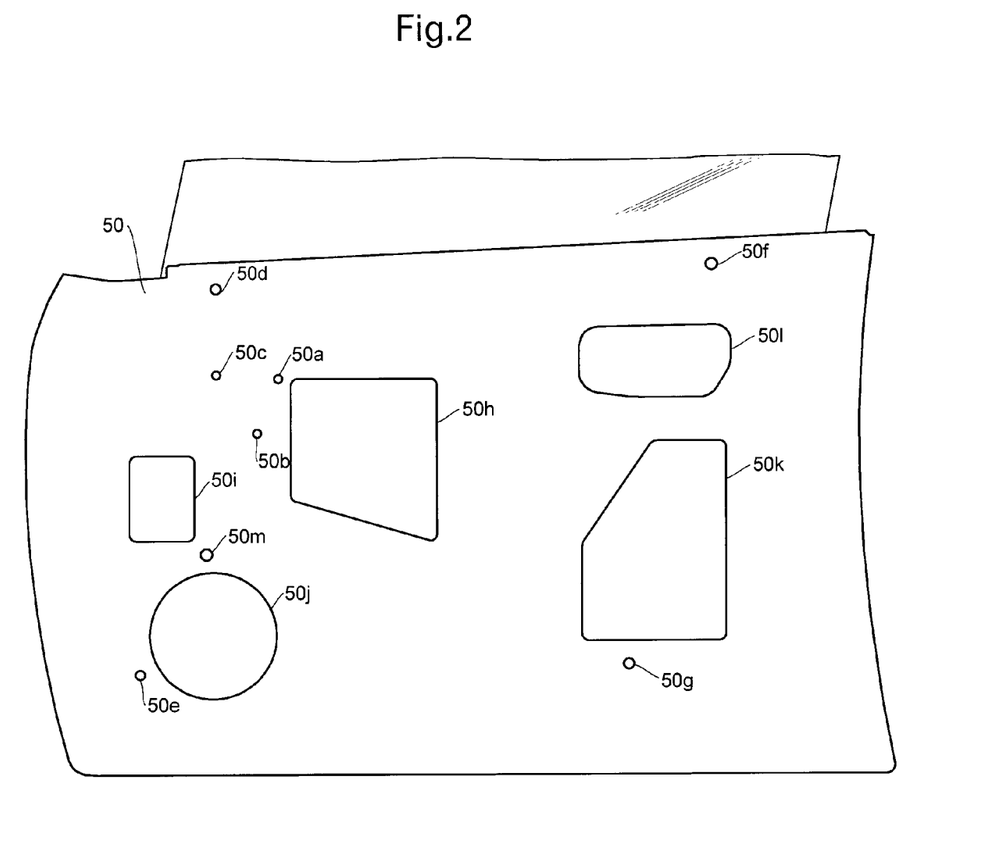
FIG. 2 is a drawing showing the inner panel to be mounted on the door in FIG. 1.

As shown in FIG. 1 and FIG. 2, a window regulator 55 for moving a window glass 53 upward and downward is disposed in a space between an inner panel 50 (inside panel) and an outer panel (outside panel) 51 which constitute a door panel.

Subsequently, a configuration of the window regulator 55 will be described. The inner panel 50 is formed with mounting holes 50a, 50b, and 50c. A wire drive unit 57 is mounted on a surface of the inner panel 50 opposing the outer panel 51 using the mounting holes 50a, 50b, and 50c. More specifically, the wire drive unit 57 is provided with bolts to be inserted into the mounting holes 50a, 50b, and 50c. Then, the wire drive unit 57 is mounted on the inner panel 50 by the bolts inserted into the mounting holes 50a, 50b, and 50c and tightened with nuts screwed on the inserted portions thereof.

Figure 3:
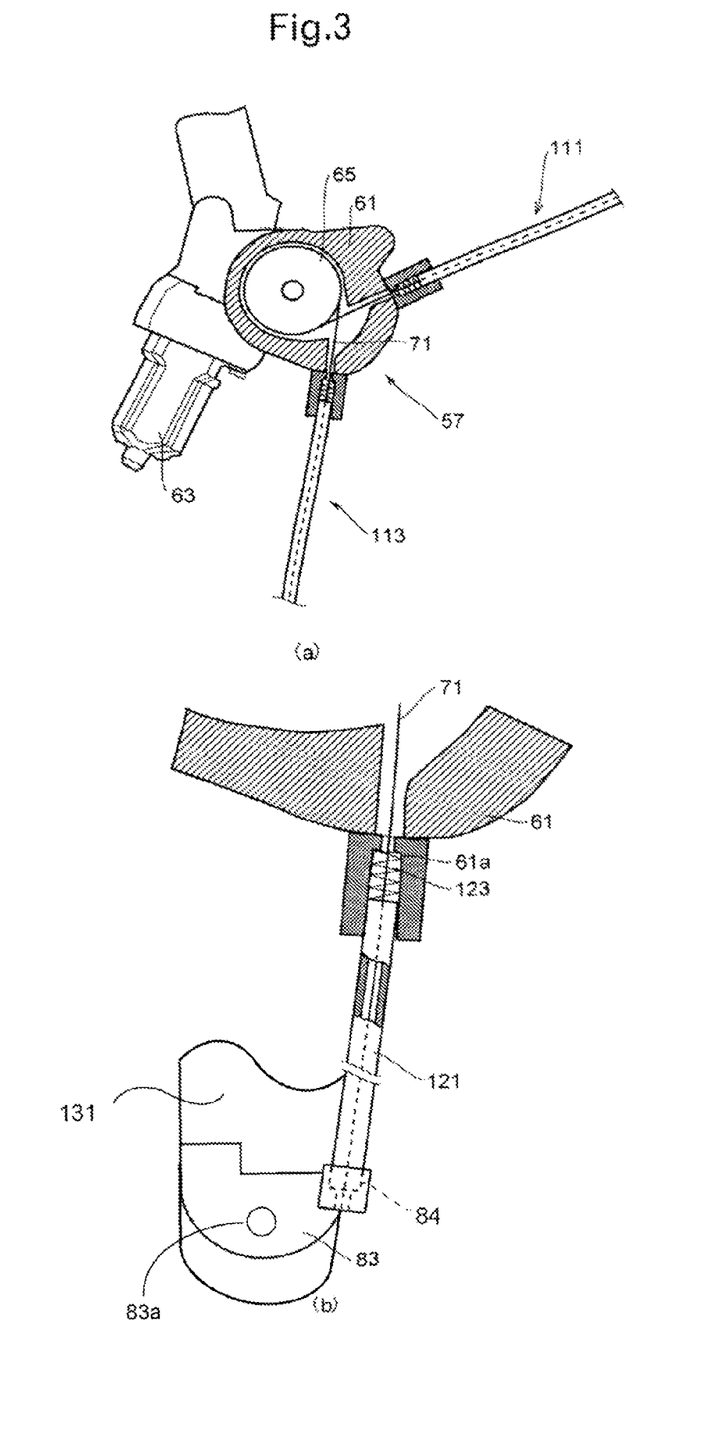

As shown in FIG. 3, a drum 65 is mounted rotatably on a base 61 of the wire drive unit 57. The drum 65 is configured to be rotated in a normal direction or a reverse direction by a motor 63. Then, a wire 71 has a substantially annular shape and is partly wound around the drum 65.

Referring back to FIG. 1 and FIG. 2, a first upper guide member 81 and a first lower guide member 83 for guiding the wire 71 are provided on the surface of the inner panel 50 opposing the outer panel 51 so as to extend along the directions of upward and downward movements of the window glass 53. Also, a second upper guide member 91 and a second lower guide member 93 are provided on the surface of the inner panel opposing the outer panel 51 so as to extend along the directions of upward and downward movements of the window glass 53. The first upper guide member 81 is mounted using a mounting hole 50d of the inner panel 50. The first lower guide member 83 is mounted using a mounting hole 50e of the inner panel 50. The second upper guide member 91 is mounted using a mounting hole 50f of the inner panel 50. The second lower guide member 93 is mounted using a mounting hole 50g of the inner panel 50. More specifically, the first upper guide member 81, the second upper guide member 91, and the second lower guide member 93 are provided with bolts to be inserted into the mounting holes 50d, 50f, and 50g. Then, the first upper guide member 81, the second upper guide member 91, and the second lower guide member 93 are fixed to the inner panel 50 by the bolts inserted into the mounting holes 50d, 50f, and 50g and tightened with nuts screwed on the inserted portions thereof.

Members other than the first lower guide member 83 in this embodiment are pulleys. Also, the first lower guide member is a fixed guide formed with a groove which allows engagement of the wire 71 on an outer peripheral surface thereof. Furthermore, the first upper guide member 81 is supported on the base 61 of the wire drive unit 57 via a bracket 80.

The first lower guide member 83 is mounted on the inner panel 50 using a bracket 131. The bracket 131 is formed with a column-shaped projection 131a on the surface opposing the inner panel 50 on the side of one end portion thereof as shown in FIG. 4. The projection 131a is fitted into a hole 50m of the inner panel 50, so that the bracket 131 is rotatable on the surface which is substantially parallel to the inner panel 50. The first lower guide member 83 is fixed to a midsection of the bracket 131 by techniques such as welding or screwing.

The first lower guide member 83 is formed with a female screw hole 83a toward the bracket 131. The bracket 131 is formed with a hole 131b which opposes the female screw hole 83a of the first lower guide member 83. Then, the bracket 131 and the first lower guide member 83 are mounted on the inner panel 50 by a bolt 133 which is penetrated from the mounting hole 50e of the inner panel 50 through the hole 131b of the bracket 131, and is screwed into the female screw hole 83a of the first lower guide member 83.

In addition, the inner panel 50 is provided with five large holes (service holes). Formed at a substantially center portion is a hole 50h for installing the window regulator. Formed on an front upper portion is a hole 50i for assembling a door-inspection apparatus, and formed on a front lower portion is a hole 50j for assembling a door speaker. Formed on a rear lower portion is a hole 50k for assembling the window regulator and formed on a rear upper portion is a hole 50l for assembling a door lock apparatus.

The wire 71 is wound on the first lower guide member 83, the first upper guide member 81, the second lower guide member 93, and the second upper guide member 91 in sequence in a substantially N-shape.

First window glass mounting means (glass holder) 101 for mounting the window glass 53 is provided on a portion of the wire 71 between the first upper guide member 81 and the first lower guide member 83 (a portion of the wire 71 extending along the direction of upward and downward movement of the window glass 53). Also, second window glass mounting means (glass holder) 103 for mounting the window glass 53 is provided on a portion of the wire 71 between the second upper guide member 91 and the second lower guide member 93 (a portion of the wire 71 extending along the direction of upward and downward movement of the window glass 53).

The window regulator 55 is provided with the slack preventing means for eliminating the slack of the wire 71. In this embodiment, first slack preventing means 111 is provided between the wire drive unit 57 and the second upper guide member 91. Also, second slack preventing means 113 is provided between the wire drive unit 57 and the first lower guide member 83. The structure of the first slack preventing means 111 and the structure of the second slack preventing means 113 are the same. Therefore, the description of the structure is given by the second slack preventing means 113, and the description of the structure of the first slack preventing means is omitted.

As shown in FIG. 3(b), a tube 121 for allowing insertion of the wire 71 in the interior thereof is arranged between the wire drive unit 57 and the first lower guide member 83. The side of one end portion of the tube 121 is fitted to a bottomed hole 61a provided on the base 61 of the wire drive unit 57. The side of the other end portion of the tube 121 is fitted to the bottomed hole 84 formed on the first lower guide member 83. Arranged in the interior of the bottomed hole 61a of the wire drive unit 57 is a resilient member (coil spring) 123 configured to urge the tube 121 toward the first lower guide member 83 by being abutted against the bottom surface of the bottomed hole 61a at one end portion and being abutted against an end surface of the tube 121 at the other end portion. Then, when the wire 71 between the wire drive unit 57 and the first lower guide member 83 is loosened, the resilient member 123 expands and the tube 121 is pushed out from the bottomed hole 61a, so that the slack of the wire 71 is absorbed. In contrast, when the wire 71 between the wire drive unit 57 and the first lower guide member 83 is tensed, the resilient member 123 contracts and the tube 121 is further inserted into the bottomed hole 61a, so that the slack of the wire 71 is absorbed.

Furthermore, as shown in FIG. 1, a tube 125 for allowing insertion of the wire 71 in the interior thereof is also arranged between the first upper guide member 81 and the second lower guide member 93.

An operation of the configuration described above will now be described. The first slack preventing means 111 and the second slack preventing means 113 are configured to absorb the slack of the wire 71 to prevent the wire 71 from coming off the guide member.

When the motor 63 is moved to rotate the drum 65 in the normal direction or the reverse direction to move the wire 71, the window glass 53 mounted on the wire 71 via the first window glass mounting means 101 and the second window glass mounting means 103 is moved upward and downward.

Subsequently, a procedure for assembling the window regulator 55 having the configuration as described above will be described.

The window regulator 55 is supplied to an assembly process in a state of being bundled with a band 151 so as to prevent a wire portion from getting tangled up as shown in FIG. 5.

(1) The window regulator 55 is inserted into a space between the inner panel 50 and the outer panel 51 from the hole 50h at the center portion of the inner panel in a state of being bundled with the band 151 as shown in FIG. 5.

(2) The wire drive unit 57 is mounted on the inner panel 50.

(3) The first upper guide member 81 supported via the bracket 80 is mounted on the inner panel 50.

(4) The bunt 151 is cut off. Then, by the urging forces of the springs of the first slack preventing means 111 and the second slack preventing means 113, the wire 71 is moved in the directions indicated by an arrow D and an arrow E in FIG. 1, and the window regulator 55 is deployed in a predetermined shape without tangling of the wire 71.

(5) The second upper guide member 91 is mounted on the inner panel 50 using the hole 50l of the inner panel 50.

(6) The second lower guide member 93 is mounted on the inner panel 50 using the hole 50k of the inner panel 50.

(7) The first lower guide member 83 is mounted on the inner panel 50 using the hole 50j of the inner panel 50. More specifically, the projection 131a of the bracket 131 is fitted to the hole 50m of the inner panel 50. By the urging force of the slack preventing means, the bracket 131 assumes a position indicated by a double-dashed line in FIG. 1. Here, a hand is inserted from the hole 50j of the inner panel 50, an operating force is applied at the other rotating end portion of the bracket 131 on the other side, the bracket 131 is rotated against the urging force of the slacking means, and the female screw hole 83a of the first lower guide member 83 and the hole 131b of the bracket 131 are brought to oppose the hole 50e of the inner panel 50. Then, the bracket 131 and the first lower guide member 83 are mounted on the inner panel 50 with the bolt 133.

(8) The window glass 53 is inserted from a hole formed on a belt line. Using the hole 50i of the inner panel 50, the window glass 53 is mounted on the first window glass mounting means 101. Using the hole 50k of the inner panel 50, the window glass 53 is mounted on the second window glass mounting means 103.

In this configuration, the following effects are achieved.

(1) The bracket is 131 mounted rotatably on the inner panel 50. Therefore, the first lower guide member 83 may be guided to the mounting position on the inner panel 50 only by rotating the bracket 131, so that easy assembly is achieved.

(2) The one of the end portions of the bracket 131 is mounted rotatably on the inner panel 50 and the first lower guide member 83 is provided at the midsection thereof. Therefore, the bracket 131 may be rotated with the weak force by the principle of a lever only by applying the operating force to the side of the other end portion of the bracket 131. In other words, the first lower guide member 83 may be guided to the mounting position on the inner panel 50 with the weak force, so that easy assembly is achieved.

(3) By the fact that the rotating plane of the bracket 131 is substantially parallel to the inner panel 50, the invention is also applicable to a door whose distance between the inner panel 50 and the outer panel 51 is small (a door having a small thickness).

Second Embodiment

Although the rotating plane of the bracket is substantially parallel to the inner panel in the first embodiment, it may be a direction intersecting the inner panel. In this embodiment, a case in which the guide member to be mounted at last is the second lower guide member 93 is assumed. As shown in FIG. 6(a) and FIG. 6(b), the second lower guide member 93 is provided at a midsection of a bracket 201. Furthermore, a bolt 203 is provided on a surface of the bracket 201 opposing the inner panel 50. The bracket 201 is formed with a shoulder 201a on the side of one end portion thereof. In contrast, the inner panel 50 is formed with a hole 207 which allows engagement with the shoulder 201a of the bracket 201, and a hole 209 which allows insertion of the bolt 203.

Then, when the shoulder 201a of the bracket 201 is inserted into the hole 207 of the inner panel, the bracket 201 is brought into a state in which the side of the other end portion of the bracket 201 is apart from the inner panel 50 as shown in FIG. 6(b) by the urging force of the slack preventing means. Here, the operating force in the direction indicated by the arrow E is applied to the other rotating end portion of the bracket 201. Then, the bracket 201 rotates on a plane which intersects the inner panel 50 about the shoulder 201a as a fulcrum against the urging force of the slacking means. Then, the bolt 203 of the second lower guide member 93 is inserted through the hole 209 of the inner panel 50, and the bracket 201 and the second lower guide member 93 are mounted on the inner panel 50 using a nut, not shown.

In this configuration, the side of the surface of the inner panel 50 opposing the outer panel is needed to have a portion where components or the like cannot be disposed (a dead space) so as to avoid interference with the rotating bracket. However, in this embodiment, the rotating plane of the bracket 201 is the plane intersecting the inner panel 50, so that the dead space on the side of the surface of the inner panel 50 opposing the outer panel 51 may be small.

Third Embodiment

There is a method of using a jig instead of the bracket. In this embodiment, a case in which the guide member to be mounted at last is the second lower guide member 93 is assumed. As shown in FIG. 7(a) and FIG. 7(b), a jig 401 is formed with a recess 401a in which the second lower guide member 93 is stored at a midsection thereof by techniques such as folding technique. A bottom surface 401b of the recess 401a is formed with a hole 401c for allowing loose fit of a revolving shaft of the second lower guide member 93. In addition, formed on a side portion of the recess 401a are substantially L-shaped two claw portions 401d and 401e which are engageable and disengageable with the surface of the second lower guide member 93 opposing the inner panel 50. In this embodiment, the jig 401 is manufactured of resin having flexibility.

Therefore, the bottom surface 401b of the recess 401a, two wall surfaces 401f and 401g of the recess 401a, and the two claw portions 401d and 401e of the jig 401 constitute a guide member mounting portion which allows the engagement and disengagement of the second lower guide member 93.

In addition, the jig 401 is formed with a shoulder 401h on the side of one end portion thereof as in the case of the bracket 201 in the second embodiment. A bolt 403 is provided on a surface of the second lower guide member 93 opposing the inner panel 50.

As shown in FIG. 7(c), the inner panel 50 is formed with the hole 207 which allows engagement with the shoulder 401h of the jig 401, and the hole 209 which allows insertion of the bolt 403 of the second lower guide member 93.

Then, as shown in FIG. 7(c), when the shoulder 401h of the jig 401 is inserted into the hole 207 of the inner panel 50 in a state in which the second lower guide member 93 is placed on the recess 401a of the jig 401 and the claw portions 401d, 401e are engaged with the second lower guide member 93, the jig 401 assumes a state as shown in FIG. 7(c) by the urging force of the slack preventing means. Here, an operating force in the direction indicated by an arrow F is applied to the other rotating end portion of the jig 401. Then, the jig 401 rotates on a plane which intersects the inner panel 50 about the shoulder 401h as a fulcrum against the urging force of the slacking preventing means. Then, the bolt 403 of the second lower guide member 93 is inserted through the hole 209 of the inner panel 50, and the second lower guide member 93 is mounted to the inner panel 50 using a nut, not shown. Then, when the jig 401 is rotated in a direction opposite from the arrow F, the claw portions 401d, 401e are resiliently deformed, and the engagement between the claw portions 401d, 401e and the second lower guide member 93 is released, so that the jig 401 may be removed.

In this configuration, the following effects are achieved.

(1) The jig 401 is mounted rotatably on the inner panel 50. Therefore, the second lower guide member 93 may be guided to the mounting position on the inner panel 50 only by rotating the jig 401, so that easy assembly is achieved.

(2) Since the jig 401 is mounted rotatably on the inner panel 50 at the one end portion thereof, and is provided with the second lower guide member 93 in the midsection thereof, the jig 401 may be rotated with the small force by the principle of a lever by applying the operating force on the side of the other end portion of the jig 401. In other words, the second lower guide member 93 may be guided to the mounting position on the inner panel 50 with the weak force, so that easy assembly is achieved.

(3) The side of the surface of the inner panel 50 opposing the outer panel is needed to have the portion where the components or the like cannot be disposed (the dead space) so as to avoid interference with the rotating jig. However, in this embodiment, the rotating plane of the jig 401 is the plane intersecting the inner panel 50, so that the dead space on the side of the surface of the inner panel 50 opposing the outer panel 51 may be small.

(4) The bracket 131 and the bracket 201 in the first and second embodiments are members which function only in the component mounting operation, and do not function for the operation of the wind regulator apparatus. The bracket 131 and the bracket 201 are left in the door.

In contrast, in the third embodiment, the jig 401 is a member which functions only in the component mounting operation, and does not function for the operation of the wind regulator apparatus. However, the jig 401 is removed and is not left in the door. Therefore, weight reduction of the wind regulator and cost reduction of the components are achieved.

The present invention is not limited to the above-described three embodiments. Although the wind regulators in the above-described three embodiments have been described as a type having the four guide members and the wire being wound in the substantially N-shape, it is needless to say that it may be applied to a wind regulator having two guide members described in the related art.

BRIEF DESCRIPTION OF THE DRAWINGS

FIG. 3 (*a*) is an enlarged view, partly broken, of a wire drive unit, and (*b*) is an explanatory drawing of second slack preventing means.

Figure 6:
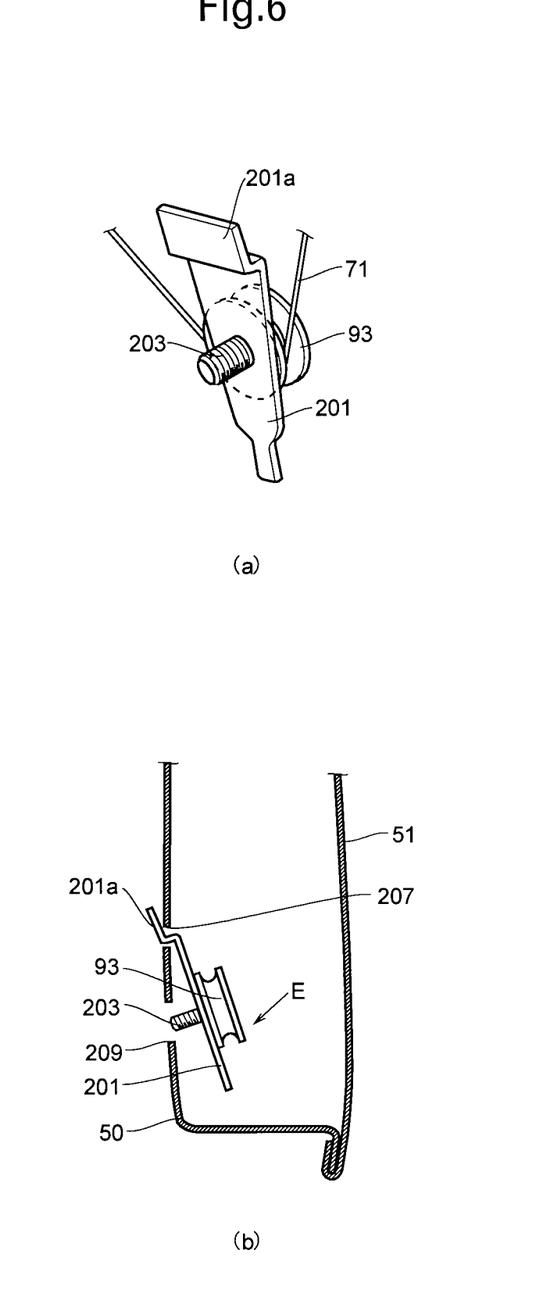
FIG. 6 is a drawing for explaining an invented portion of a second embodiment, in which (a) is a perspective view of the bracket, and (b) is a drawing for explaining an operation of the bracket.
Figure 7:
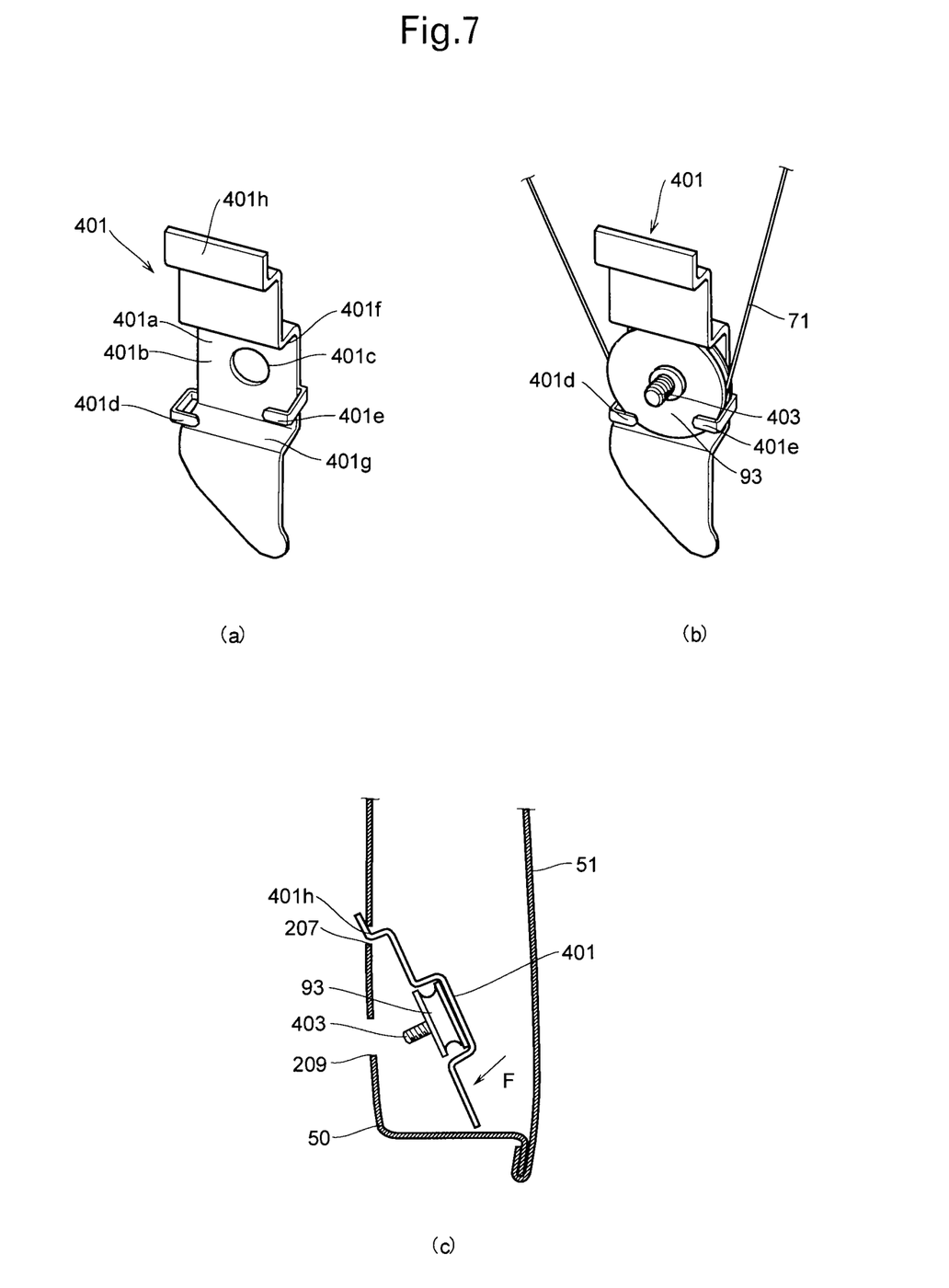
FIG. 7 is a drawing for explaining an invented portion of a third embodiment, in which (a) is a perspective view of a jig, (b) is a perspective view showing a state in which a second lower guide member is mounted on the jig in (a), and (c) is a drawing for explaining an operation of the jig.

DESCRIPTION OF THE REFERENCE NUMERALS AND SIGNS 50 inner panel
51 outer panel
53 window glass
71 wire
81, 83, 91, 93 guide member
101, 103 window glass mounting means
131 bracket
[FIG. 1]
WINDOW GLASS 53
FIRST UPPER GUIDE MEMBER 81
BRACKET 80
FIRST WINDOW GLASS MOUNTING MEANS 101
FIRST SLACK PREVENTING MEANS 111
WIRE DRIVE UNIT 57
SECOND UPPER GUIDE MEMBER 91
SECOND WINDOW GLASS MOUNTING MEANS 103
WIRE 71
BRACKET 131
SECOND SLACK PREVENTING MEANS 113
FIRST LOWER GUIDE MEMBER 83
TUBE 125
WINDOW REGULATOR 55
SECOND LOWER GUIDE MEMBER 93
[FIG. 2]
INNER PANEL 50
[FIG. 3(*a*)]
DRUM 65
BASE 61
WIRE 71
WIRE DRIVE UNIT 57
MOTOR 63
[FIG. 3(*b*)]
WIRE 71
BASE 61
BOTTOMED HOLE 61*a*
RESILIENT MEMBER 123
TUBE 121
BOTTOMED HOLE 83*a*
FIRST LOWER GUIDE MEMBER 83
[FIG. 4]
BOLT 133
FIRST LOWER GUIDE MEMBER 83
HOLE 131*b*
FEMALE SCREW HOLE 83*a*
BRACKET 131
PROJECTION 131*a*
[FIG. 5]
WINDOW REGULATOR 55
BAND 151
[FIG. 6(*a*)]
SHOULDER 201*a*
BOLT 203
WIRE 71
SECOND LOWER GUIDE MEMBER 93
BRACKET 201
[FIG. 6(*b*)]
HOLE 209
BRACKET 201
INNER PANEL 50
OUTER PANEL 51
HOLE 207
[FIG. 7(*a*)]
JIG 401
SHOULDER 401*h*
RECESS 401*a*
BOTTOM SURFACE 401*b*
CLAW PORTION 401*d*
WALL SURFACE 401*f*
HOLE 401*c*
CLAW PORTION 401*e*
WALL SURFACE 401*g*
[FIG. 7(*b*)]
WIRE 71
BOLT 403
SECOND LOWER GUIDE MEMBER 93
[FIG. 7(*c*)]

HOLE 207
SECOND LOWER GUIDE MEMBER 93
HOLE 209
INNER PANEL 50
OUTER PANEL 51
JIG 401
[FIG. 8]
DRUM 9
BASE 7
HANDLE 11
WINDOW GLASS 3
UPPER GUIDE MEMBER 15
WINDOW GLASS MOUNTING MEANS 19
DOOR PANEL 1
WINDOW REGULATOR 5
LOWER GUIDE MEMBER 16
WIRE 13

The invention claimed is:

1. A window regulator including:
a drum mounted on an inner panel of a door on a side of a surface opposing an outer panel, the drum configured to be able to rotate in a clockwise-direction and a counter clockwise direction;
an annular wire partly wound around the drum;
a plurality of guide members mounted on the inner panel of the door on the side of the surface opposing the outer panel and configured to guide the wire so that the wire is arranged along a direction of upward and downward movement of a window glass;
wherein the wire from the drum is wound through a first guide member from among the plurality of guide members to a remainder of the plurality of guide members;
a slack preventing member configured to reduce slack in the wire;
the slack preventing member is provided between the drum and the first guide member from among the plurality of guide members;
the slack preventing member has a tube for allowing insertion of the wire and a resilient member, wherein when the wire is loosened, the resilient member expands and the slack of the wire is absorbed;
window glass mounting means configured to mount the window glass to the wire at a portion extending along the direction of upward and downward movement of the window glass, in which the wire is moved by rotating the drum in the clockwise direction or the counterclockwise direction to move the window glass upward and downward;
a bracket configured to be mounted rotatably on the inner panel about a center of rotation at a first position along the bracket and having the first guide member from among the plurality of guide members mounted at a portion along the bracket other than at the center of rotation of the bracket, and the bracket being further configured to guide the first guide member mounted at a portion along the bracket other than at the center of rotation of the bracket to a mounting position on the inner panel against an urging force of the slack preventing member by rotation of the bracket about the center of rotation of the bracket wherein the resilient member is compressed by the rotation of the bracket against the urging force; and
a member located at a second position along the bracket, different than said first position, for holding the bracket in position when the first guide member is in said mounting position, to thereby prevent rotation of the bracket;
the member fixing the bracket at a point except a pivot point of the bracket.

2. A window regulator as in claim 1 wherein the member is a bolt that protrudes through the inner panel and is fastened through a hole in the bracket located at the second position along the bracket.

3. A window regulator including:
a drum mounted on an inner panel of a door, the drum being configured to be rotatable;
a wire at least partly wound around the drum;
a plurality of guide members mounted on the inner panel configured to guide the wire so that the wire is arranged along a direction of upward and downward movement of a window glass;
the wire from the drum is wound through a first guide member from among the plurality of guide members to a remainder of the plurality of guide members;
a slack preventing member to reduce slack in the wire;
the slack preventing member is provided between the drum and the first guide member from among the plurality of guide members;
the slack preventing member has a tube for allowing insertion of the wire and a resilient member, wherein when the wire is loosened, the resilient member expands and the slack of the wire is absorbed;
a window glass mounting means configured to mount the window glass to the wire, such that rotation of the drum moves the window glass upward and downward;
a bracket mounted rotatably on the inner panel about a center of rotation of the bracket;
the bracket configured to move the first guide member against an urging force of the slack preventing member by rotating about the center of rotation;
the resilient member being compressed by the rotation of the bracket against the urging force; and
a bolt that passes through the inner panel and fastened through a hole in the bracket and having the first guide member from among the plurality of guide members mounted at an end of the bracket opposite the center of rotation that prevents rotation of the bracket.

4. A window regulator as in claim 3, wherein the first guide member is mounted to the bracket by the bolt which protrudes from the inner panel and is fastened through a hole in the bracket.

* * * * *

UNITED STATES PATENT AND TRADEMARK OFFICE
CERTIFICATE OF CORRECTION

| | |
|---|---|
| PATENT NO. | : 8,819,995 B2 |
| APPLICATION NO. | : 12/519140 |
| DATED | : September 2, 2014 |
| INVENTOR(S) | : Kimihiro Kinoshita et al. |

It is certified that error appears in the above-identified patent and that said Letters Patent is hereby corrected as shown below:

Title Page: Item 73 should read
Shiroki Kogyo Co., Ltd., Kanagawa, (JP);
Toyota Jidosha Kabushiki Kaisha, Aichi (JP)

Signed and Sealed this
Seventeenth Day of November, 2015

Michelle K. Lee
*Director of the United States Patent and Trademark Office*